United States Patent [19]

Sato et al.

[11] Patent Number: 4,677,621

[45] Date of Patent: Jun. 30, 1987

[54] SIGNAL STORAGE SYSTEM

[75] Inventors: Kazuhiro Sato, Setagaya; Masahiro Achiha, Iruma; Shusaku Nagahara, Hachioji, all of Japan

[73] Assignee: Hitachi, Ltd., Tokyo, Japan

[21] Appl. No.: 697,761

[22] Filed: Feb. 4, 1985

[30] Foreign Application Priority Data

Feb. 6, 1984 [JP] Japan .................................. 59-18317

[51] Int. Cl.$^4$ ............................................ G06F 11/10
[52] U.S. Cl. ...................................... 371/30; 360/32; 360/53
[58] Field of Search ...................... 371/30, 38; 360/32, 360/53

[56] References Cited

U.S. PATENT DOCUMENTS

| | | | |
|---|---|---|---|
| 4,423,441 | 12/1983 | Ozaki et al. ............................. | 360/32 |
| 4,523,237 | 6/1985 | Fukuda et al. ...................... | 360/32 X |
| 4,558,379 | 12/1985 | Hutter et al. .......................... | 360/32 |
| 4,562,488 | 12/1985 | Koyama et al. ....................... | 360/32 |
| 4,590,522 | 5/1986 | Takemoto et al. ............... | 360/32 X |
| 4,590,524 | 5/1986 | Okamoto et al. ................. | 360/32 X |

Primary Examiner—Charles E. Atkinson
Attorney, Agent, or Firm—Antonelli, Terry & Wands

[57] ABSTRACT

An analog signal is stored in an analog memory device, while lower bits of a digital signal obtained by digitizing the analog signal is stored in a digital memory device. An analog signal reproduced from the analog memory device is corrected on the basis of a digital signal reproduced from the digital memory device. The corrected reproduced signal is stored in the memory device again, whereby a recursive storage system is constructed. A signal component degraded by noise in the analog storage is corrected with the digital signal, with the result that storage and reproduction of favorable signal-to-noise ratio are realized.

20 Claims, 6 Drawing Figures

| ANALOG LEVEL | DIGITAL SIGNAL (d) | LOWER TWO BITS (7b) | OUTPUT OF DIGITAL MEMORY 4 (4a) | OUTPUT OF SUBTRACTER 8 (8a) C 13a 13b |
|---|---|---|---|---|
| 16 | 1 0 0 0 0 | 0 0 | 1 1 | 0 0 1 |
| 15 | 0 1 1 1 1 | 1 1 | 1 1 | 1 0 0 |
| 14 | 0 1 1 1 0 | 1 0 | 1 1 | 0 1 1 |

| ANALOG LEVEL | DIGITAL SIGNAL (d) | LOWER TWO BITS (7b) | OUTPUT OF DIGITAL MEMORY 4 (4a) | OUTPUT OF SUBTRACTER 8 (8a) C 13a 13b |
|---|---|---|---|---|
| 21 | 1 0 1 0 1 | 0 1 | 0 0 | 1 0 1 |
| 20 | 1 0 1 0 0 | 0 0 | 0 0 | 1 0 0 |
| 19 | 1 0 0 1 1 | 1 1 | 0 0 | 1 1 1 |

SIGNAL STORAGE SYSTEM

The present invention relates to a signal storage system capable of storing and reproducing a video signal, an audio signal etc. at a high signal-to-noise ratio.

As a method of storing an analog signal, such as a video signal, into a storage device under a state of favorable signal-to-noise ratio, the analog signal is converted first into a digital signal, which is then stored.

When one frame of the current television system such as the NTSC system or PAL system, is converted into a digital signal, it becomes digital data of approximately 2 megabits ($2 \times 10^6$ bits), and when the signal of a high definition television camera having about 1000 scanning lines is converted into a digital signal of 8 bits, it becomes data of approximately 8 megabits ($8 \times 10^6$ bits).

When it is intended to store such large quantities of data into, for example, a present-day semiconductor memory, large quantities of memory devices are required. As a result, the circuit scale becomes large, causing the overall system to be larger in size and higher in cost.

In order to reduce the storage capacity, the analog signal may be directly stored without converting it into a digital signal. At present, however, there is no semiconductor memory which can store an analog signal for a long time.

An object of the present invention is to provide a storage system which is capable of signal storage at a favorable signal-to-noise ratio with a storage capacity equal to several tenths of that of the prior-art digital signal storage.

Such object is accomplished by the present invention which provides a storage system comprising a first analog-to-digital converter which converts an analog signal to-be-stored into a digital signal; storage means for respectively storing the analog signal and a signal of lower bits in the digital signal delivered from said first analog-to-digital converter; a second analog-to-digital converter which converts into a digital signal an analog signal reproduced from the analog signal storage in said storage means; means for correcting the digital signal delivered from said second analog-to-digital converter, on the basis of a digital signal reproduced from the lower bit signal storage in said storage means; and a digital-to-analog converter which converts into an analog signal the digital signal corrected by said means for correcting.

Figure 1:
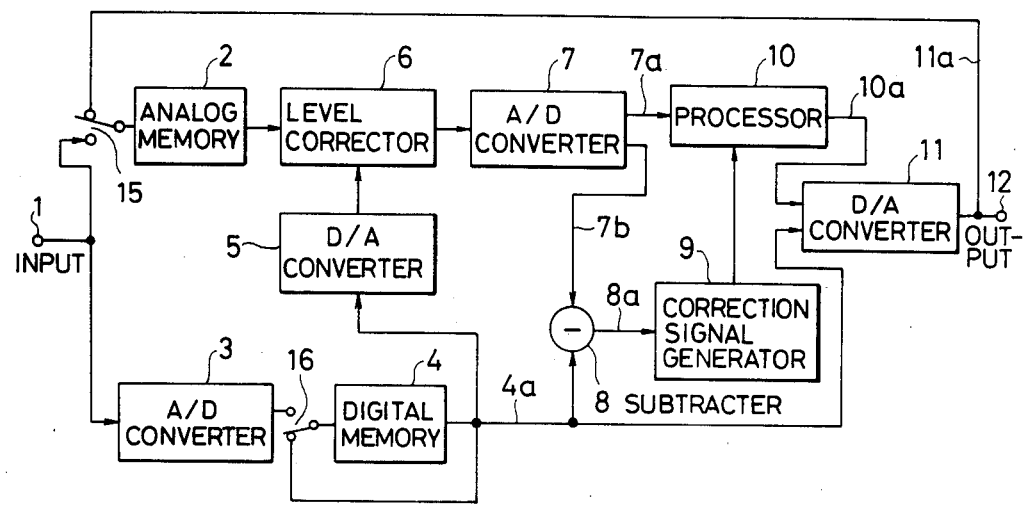
FIG. 1 is a block diagram showing an embodiment of the present invention.

An embodiment of the present invention is shown in FIG. 1. An analog signal such as a video signal applied to an input terminal 1 is stored into an analog memory device 2 through a switching circuit 15, while at the same time it is converted into a digital signal of m bits by an analog-to-digital converter (A/D converter) 3. Only the lower k bits among the m bits of the digital signal is stored into a digital memory device 4 through a switching circuit 16.

When the signals have been stored, the switching circuits 15 and 16 are brought back to the illustrated positions.

As the memory device 2 or 4, a charge transfer device memory such as CCD (Charge Coupled Device) or a MOS (Metal Oxide Semiconductor) memory can be used. In the present embodiment, the CCD memory is employed as the memory device 2, and the MOS memory as the memory device 4.

Figure 2A:
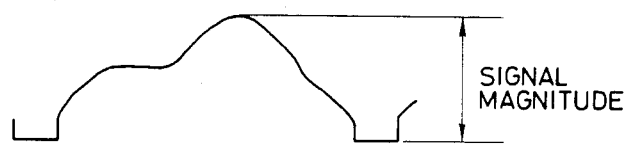
FIGS. 2A and 2B are waveform diagrams for explaining the operation of the embodiment in FIG. 1.
Figure 2B:
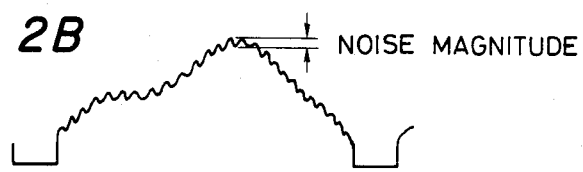

When the analog signal is stored into or reproduced from the memory device 2, noise develops from an amplifier or a storage medium to degrade the signal as illustrated in FIGS. 2A and 2B. By way of example, when the signal shown in FIG. 2A is stored or reproduced, it has noise added thereto as seen by the waveform shown in FIG. 2B.

Here, when the signals shown in FIGS. 2A and 2B are each converted into digital signals of m bits by an A/D converter, and the two digital signals are compared the lower k significant bits in the two signals will be unequal as a result of the noise, but the upper $(m-k)$ significant bits will agree or differ at most by $\pm 1$.

Accordingly, signal storage corresponding to m bits is permitted with a smaller storage capacity than in the prior art in such a way that the input signal of an analog memory device is converted into a digital signal of m bits and that only the signal of the lower k bits of the m bits is stored in a digital storage device with which the influence of noise is negligible, the digital signal storage being used conjointly with analog signal storage.

The storage capacity of an analog memory device necessary for storing a certain signal is 1/m of the storage capacity required for the digital storage of this signal. Therefore, when the signal storage system of the present invention is employed, the capacity of the memory device can be reduced to $(k+1)/m$ as compared with that in the digital storage of all the m bits.

In FIG. 1, a digital-to-analog converter (D/A converter) 5, a level corrector 6, an A/D converter 7, a subtracter 8, a correction signal generator 9, a processor 10 and a D/A converter 11 constitute a circuit for reproducing the original signal from the signals stored in the analog and digital memory devices. Now, a signal reproducing method will be explained.

As stated before, the signal having passed through the analog memory device 2 is affected by noise, and when it is converted into a digital signal by the A/D converter 7, the lower bits will be erroneous, but the error can be corrected by the use of the output of the digital memory device 4. This principle will be described with reference to FIGS. 3 and 4. In order to facilitate the description, a case where m=5 and k=2 will be taken as an example.

A digital signal of m=5, namely, 5 bits can express $2^5=32$ analog levels. Referring now to Level 15, the digital signal of Level 15 becomes 01111. Assuming that Level 15 has changed to Level 16 or 14 under the influence of noise, the digital signal corresponding to this level changes to 10000 or 01110 as indicated at (d) in FIG. 4. As a result, the lower 2 bits (7b) change from 11 to 00 or 10.

The purport of the present invention is to replace the lower 2 bits with 11. With the mere replacement, however, a digital code corresponding to analog Level 15 can become 10011, which is a value different from 01111.

In the embodiment of the present invention, therefore, corrections to be described below are made.

Since the attenuation of the signal is inevitable in the analog memory device 2, the signal level is corrected by the level corrector 6. A television signal includes a horizontal or vertical blanking period in which no video signal exists. Therefore, a marker signal may be inserted in this part so as to make the level correction with the marker signal as a reference. Although the marker signal may be inserted into only the analog signal, it is recommended for a more precise correction to add markers of the same level to both the analog and digital signals, and also the embodiment in FIG. 1 adopts this method. The D/A converter 5 in FIG. 1 serves to convert the marker signal inserted in the digital signal into an analog signal and to supply the analog signal to the level corrector 6.

In the level corrector 6, the marker signal reproduced from the analog storage is compared with the marker signal reproduced from the digital storage, and the level of the analog signal reproduced from the analog memory device 2 is corrected so as to render the magnitude of the former marker signal equal to that of the latter marker signal.

The analog signal subjected to the level correction is converted by the A/D converter 7 into a digital signal, the signal 7b of the lower 2 bits of which is sent to the subtracter 8.

Figures 3, 4, 5:
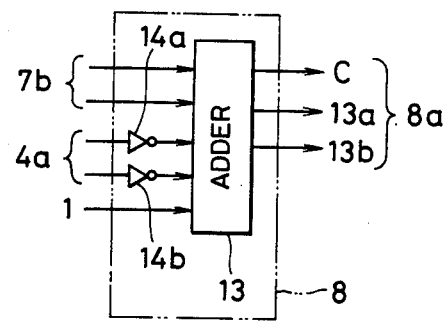
FIG. 3 is an arrangement diagram of a subtraction circuit.
FIGS. 4 and 5 are charts indicative of the signals of several portions in the embodiment of FIG. 1 for explaining methods of reproducing signals.

The subtracter 8 is a conventional circuit which produces the difference between the two digital signals 7b and 4a. As shown in FIG. 3, it is composed of inverters 14a and 14b which invert the codes of the bits of one signal 4a and an adder 13 which adds the outputs (4a) of the inverters 14a and 14b to the signal 7b and which further adds "1" to the least significant bit of the added result.

The output 8a of the subtracter 8 consists of a carry output C and upper and lower bit outputs 13a and 13b. As indicated in FIG. 4, data 001, 100 and 011 are respectively obtained in correspondence with Levels 16, 15 and 14 of the analog signal.

Here, only in a case where the carry output C and the upper bit output 13a are 00, the upper bit output 7a of the A/D converter 7 in FIG. 1, namely, 100 has "1" subtracted therefrom to be altered to 011, whereupon the lower 2 bits are replaced with the output 4a being 11. Then, the original signal can be perfectly reproduced.

FIG. 5 illustrates an example in the case where Analog Level 20 has fluctuated. In this case, when the carry output C and upper bit output 13a of the subtracter have become 11, the data 7a, namely, 100 has "1" added thereto. Then, the original signal can be reproduced.

In this manner, the carry output and most significant bit output of the subtracter 8 are monitored, and when the two outputs are 00, "1" is substituted from the least significant bit of the data 7a, while when they are 11, "1" is added to the least significant bit, whereby the original signal can be perfectly restored. The correction signal generator 9 monitors the output of the subtracter 8, and generates a correction signal of ±1. The processor 10 performs the processing of adding the correction signal of ±1 to the least significant bit of the data 7a.

Accordingly, when the output 10a of the processor 10 and the output 4a of the digital memory device 4 are applied to the D/A converter 11, an analog signal equal in quality to a digital signal of m bits can be reproduced. The output 11a of the D/A converter 11 and the output 4a of the digital memory device 4 are respectively fed back to the analog memory device 2 and the digital memory device 4 through the switching circuits 15 and 16, whereby a recursive storage system is constructed.

A signal can be stored for a long time by causing the signal to recur.

According to the present invention, the deterioration of the signal-to-noise ratio having been the most serious disadvantage of analog storage can be eliminated. Besides, the storage capacity can be reduced to several tenths as compared with that of complete digital storage.

When the required storage time of the storage device is not greater than approximately one second, the storage system according to the present invention illustrated in FIG. 1 need not be constructed as a recursive type system. In this case, the switching circuits 15 and 16 are unnecessary.

While, in the above description, the analog memory device and the digital memory device have been separately considered, it is needless to say that the signals may be stored in identical storage means in parallel or dividedly.

For example, in case of employing a CCD memory, the digital signal of k bits can also be multi-valued into $2^k$ level changes and then stored.

We claim:

1. A storage system comprising:
    a first analog-to-digital converter which converts an analog signal to-be-stored into an m-bit digital signal;
    storage means for respectively storing the analog signal and a signal consisting of the k lower significant bits in the m-bit digital signal delivered from said first analog-to-digital converter;
    a second analog-to-digital converter which converts into a digital signal an analog signal reproduced from the analog signal stored in said storage means;
    means for correcting the digital signal delivered from said second analog-to-digital converter, on the basis of a digital signal reproduced from the signal consisting of the k lower significant bits of the digital signal as stored in said storage means; and
    a digital-to-analog converter which converts into an analog signal the digital signal corrected by said means for correcting.

2. A storage system according to claim 1, wherein said storage means comprises an analog storage device which stores the analog signal, and a digital storage device which stores the signal consisting of the k lower significant bits of the digital signal.

3. A storage system according to claim 1, wherein said storage means comprises means for storing the analog signal and the signal consisting of the k lower significant bits in multiplex fashion.

4. A storage system according to claim 1, further comprising level correction means for correcting the level of the analog signal reproduced from the analog storage device in said storage means.

5. A storage system according to claim 4, wherein
    said storage means stores marker signals of an identical level as an analog signal and a digital signal, respectively; and
    said level correction means comprises means for correcting the level of the analog signal reproduced from the analog signal stored in said storage means so that the level of a marker signal reproduced from the analog storage device is made equal to the level of a marker signal reproduced from the digital signal stored in said storage means.

6. A storage system according to claim 1, wherein the k lower significant bits of the digital signal delivered from said second analog-to-digital converter are replaced with the digital signal reproduced from the k lower significant bits of the digital signal as stored in said storage means.

7. A storage system according to claim 1, wherein the (m−k) upper significant bits of the m-bit digital signal delivered from said second analog-to-digital signal converter are corrected on the basis of a difference between the k lower significant bits of the digital signal delivered from said analog-to-digital converter and the digital signal reproduced from the k lower significant bits of the digital signal as stored in said storage means.

8. A storage system according to claim 1, wherein
the k lower significant bits of the digital signal delivered from said second analog-to-digital converter are replaced with the digital signal reproduced from the k lower significant bits of the digital signal as stored in said storage means; and wherein
the (m−k) upper significant bits of the digital signal delivered from said second analog-to-digital converter are corrected on the basis of a difference between the k lower significant bits of the digital signal delivered from said second analog-to-digital converter and the digital signal reproduced from the k lower significant bits of the digital signal as stored in said storage means.

9. A storage system according to claim 1, wherein said means for correcting comprises:
means for obtaining a difference between the k lower significant bits of the digital signal delivered from said second analog-to-digital converter and the digital signal reproduced from the k lower significant bits of the digital signal as stored in said storage means;
means for generating a correction signal of +1 or −1 on the basis of the obtained difference; and
means for adding the correction signal to the (m−k) upper significant bits of the digital signal delivered from said second analog-to-digital converter.

10. A storage system according to claim 9, wherein an output of said means for adding and the digital signal reproduced from the k lower significant bits of the digital signal as stored in said storage means are applied to said digital-to-analog converter and are converted into an analog signal.

11. A storage system comprising:
a first analog-to-digital converter which converts an analog signal to-be-stored into an m-bit digital signal;
storage means for respectively storing the analog signal and a signal consisting of the k lower significant bits in the m-bit digital signal delivered from said first analog-to-digital converter;
a second analog-to-digital converter which converts into a digital signal an analog signal reproduced from the analog signal stored in said storage means;
means for correcting the digital signal delivered from said second analog-to-digital converter, on the basis of a digital signal reproduced from the signal consisting of the k lower significant bits of the digital signal as stored in said storage means;
a digital-to-analog converter which converts into an analog signal the digital signal corrected by said means for correcting;
a signal channel which feeds the output signal of said digital-to-analog converter back to said storage means in order to store said output signal in said storage means; and
a signal channel which feeds the digital signal reproduced from the lower bit signal storage back to said storage means in order to store said digital signal in said storage means again.

12. A storage system according to claim 11, wherein said storage means comprises an analog storage device which stores the analog signal, and a digital storage device which stores the signal consisting of the k lower significant bits in multiplex fashion.

13. A storage system according to claim 11, wherein said storage means comprises means for storing the analog signal and the signal consisting of the k lower significant bits in multiplex fashion.

14. A storage system according to claim 11, further comprising level correction means for correcting the level of the analog signal reproduced from the analog storage device in said storage means.

15. A storage system according to claim 14, wherein said storage means stores marker signals of an identical level as an analog signal and as a digital signal respectively; and
said level correction means comprises means for correcting the level of the analog signal reproduced from the analog signal stored in said storage means so that the level of a marker signal reproduced from the analog storage device is made equal to the level of a marker signal reproduced from the digital signal stored in said storage means.

16. A storage system according to claim 11, wherein the k lower significant bits of the digital signal delivered from said second analog-to-digital converter are replaced with the digital signal reproduced from the k lower significant bits of the digital signal as stored in said storage means.

17. A storage system according to claim 11, wherein the (m−k) upper significant bits of the m-bit digital signal delivered from said second analog-to-digital converter are corrected on the basis of a difference between the k lower significant bits of the digital signal delivered from said second analog-to-digital converter and the digital signal reproduced from the lower significant bits of the digital signal as stored in said storage means.

18. A storage system according to claim 11, wherein
the k lower significant bits of the digital signal delivered from said second analog-to-digital converter are replaced with the digital signal reproduced from the k lower significant bits of the digital signal as stored in said storage means; and wherein
the (m−k) upper significant bits of the digital signal delivered from said second analog-to-digital converter are corrected on the basis of a difference between the k lower significant bits of the digital signal delivered from said second analog-to-digital converter and the digital signal reproduced from the k lower significant bits of the digital signal as stored in said storage means.

19. A storage system according to claim 11, wherein said means for correcting comprises:
means for obtaining a difference between the k lower significant bits of the digital signal delivered from said second analog-to-digital converter and the digital signal reproduced from the k lower significant bits of the digital signal as stored in said storage means;
means for generating a correction signal of +1 or −1 on the basis of the obtained difference; and means for adding the correction signal to the (m−k) upper significant bits of the digital signal delivered from said second analog-to-digital converter.

20. A storage system according to claim 19, wherein an output of said means for adding and the digital signal reproduced from the k lower significant bits of the digital signal as stored in said storage means are applied to said digital-to-analog converter and are converted into an analog signal.

* * * * *